L. HUNT.
RACK.
APPLICATION FILED JAN. 14, 1909.
928,659.
Patented July 20, 1909.
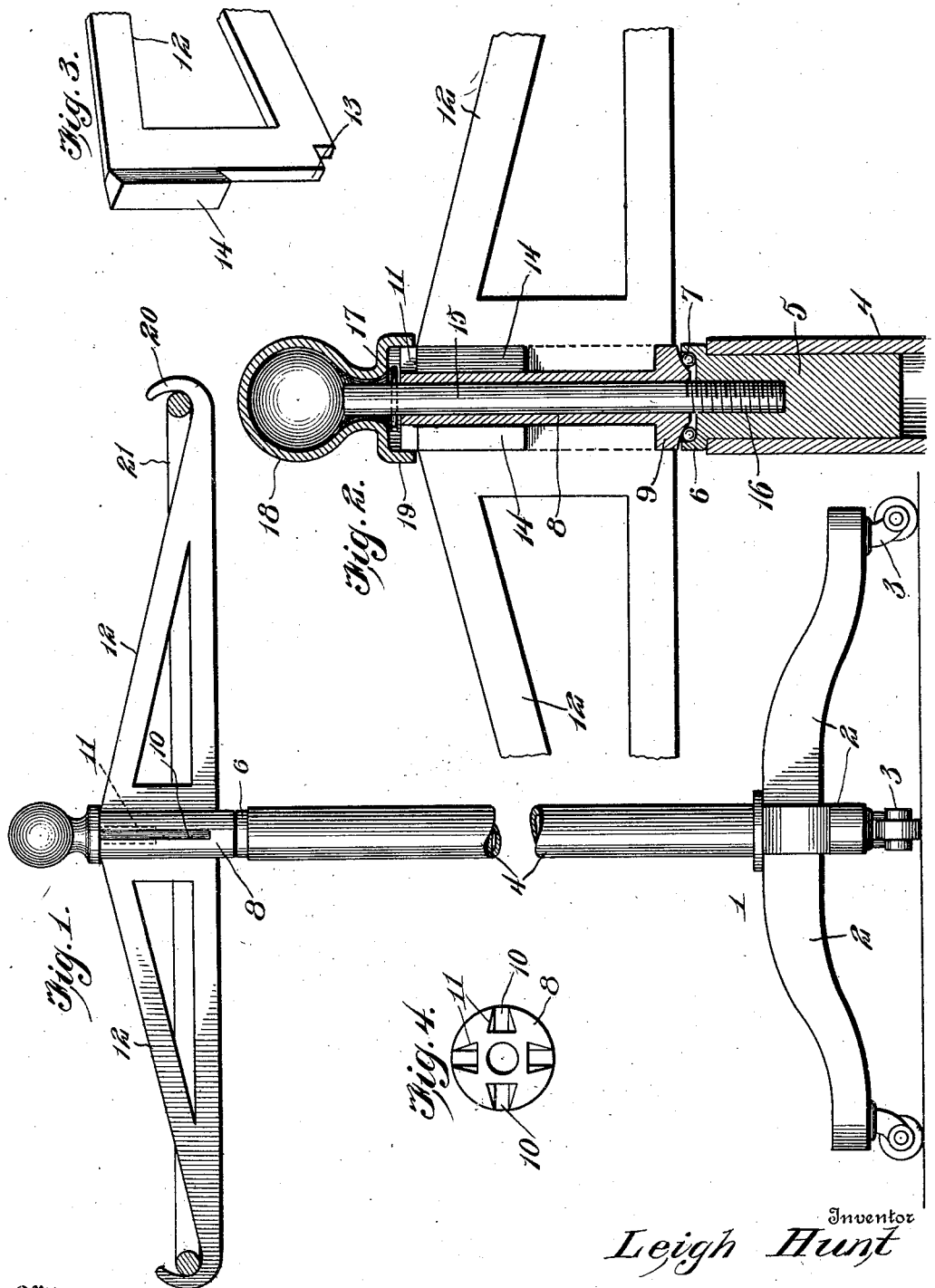
Witnesses
Louis R. Heinrichs
R. M. Smith
Inventor
Leigh Hunt
By Victor J. Evans
Attorney

UNITED STATES PATENT OFFICE.

LEIGH HUNT, OF GARRETT, INDIANA.

RACK.

No. 928,659.  Specification of Letters Patent.  Patented July 20, 1909.

Application filed January 14, 1909. Serial No. 472,328.

*To all whom it may concern:*

Be it known that I, LEIGH HUNT, a citizen of the United States, residing at Garrett, in the county of Dekalb and State of Indiana, have invented new and useful Improvements in Racks, of which the following is a specification.

This invention relates to racks for holding merchandise and various articles of all kinds, the object of the invention being to provide a knock down rack, the several parts of which are so combined with each other as to enable them to be readily disconnected from each other for storage or shipment, the rack also embodying a series of rotatable arms connected to a common head or retainer and combined with a ball bearing for the support of the rotatable portion of the rack thereby obtaining an easy turning movement while providing an effective and comparatively rigid support for the arms upon which the articles are placed.

With the above and other objects in view, the invention consists in the novel construction, combination and arrangement of parts as herein fully described, illustrated and claimed.

In the accompanying drawings:—Figure 1 is a side elevation of the complete rack constructed in accordance with the present invention. Fig. 2 is an enlarged vertical section of the upper portion of the rack, showing the manner in which the separable parts are combined. Fig. 3 is a detail perspective view of one of the arms. Fig. 4 is a top plan view of the rotary head or retainer.

The rack comprises essentially a supporting base 1 preferably composed of a series of radiating arms or lugs 2 mounted on casters 3. Extending centrally upward from the supporting base 1 is a tubular standard 4 and in the upper end of said tubular standard there is detachably inserted the shank 5 of a ball cup 6 in which is arranged a series of antifriction balls 7.

Mounted above the ball race 6 is a rotatable head or arm retainer 8 having at its lower end a ball cone 9 which rests upon the antifriction balls above referred to whereby the head is enabled to revolve freely on the top of the standard 4. The head 8 which is preferably cylindrical as shown in Figs. 1 and 4 is provided at numerous intervals in the periphery thereof with vertical slots 10 and the upper portions of said slots are expanded to form dove-tailed sockets 11 the purpose of which will hereinafter appear.

Associated with the rotary head is a series of radiating arms 12. The inner end of each arm is made of considerable height to provide a vertical bearing shoulder 13 which is received in one of the slots 10 in the head 8 while connected with or formed integrally on the upper portion of the inner end of the arm is a dove-tailed retainer lug 14 which is adapted to fit with a sliding movement into the dove-tailed socket 11 just above the parallel sided slot 10, the construction referred to serving as an interlock between the arm and head and securely holding the arm in place while allowing the same to be removed easily by lifting the lug 14 out of engagement with the dove-tailed socket 11. All of the arms 12 are combined with the rotary head in the manner just hereinabove described, thus enabling all of the arms to be easily attached and detached.

In order to retain the rotary head 8, a head retaining bolt 15 passes upward through a longitudinal bore or hole in the head 8 as shown in Fig. 2, the lower end of said bolt being screw-threaded as shown at 16 and screwed into a threaded socket of the shank 5 of the ball cup 6. Adjacent to its upper end, the bolt 15 is provided with a hole to receive a key 17 which may be in the form of a cotter pin which prevents upward movement of the rotary head 8 when said pin is in place. Finally a hollow cap 18 is placed over the upper end of the bolt 15 and is provided at its lower end with a flange 19 which embraces the upper end of the rotary head 8 as clearly shown in Fig. 4 thus giving an ornamental finish to the top of the rack. The outer extremities of the arms 12 may be hooked as shown at 20 to support and retain a ring 21, upon which the articles are adapted to be placed.

I claim:—

1. A rack embodying a supporting base, a tubular standard extending upward therefrom, a bearing removably inserted in the upper end of said standard, a rotary head superimposed on said bearing, a retaining bolt passing from the bearing upward through the rotary head, a series of radial arms detachably connected to said rotary head, and provided at their extremities with retainer hooks, and a ring supported by said arms and held in place by the retainer hooks.

2. A rack embodying a supporting base, a tubular standard extending upward therefrom, a ball cup provided with a shank detachably fitted in the upper end of said standard, a bolt connected to said ball cup and extending upward above the same, a rotary head mounted on said bolt, a series of anti-friction balls interposed between said ball cup and the rotary head a key inserted through the bolt above the head, a series of radiating arms detachably connected to the head, and a cap fitting over the upper end of the retaining bolt and the head, substantially as described.

3. A rack embodying a supporting base, a standard extending upward therefrom, a rotary head supported on said standard and provided in its outer side with a series of vertical parallel sided grooves the upper portions of which are expanded in width and in dove-tailed form, and a series of arms radially disposed with relation to the axis of movement of the head, said arms being provided with bearing shoulders which are received in said grooves and also provided with dove-tailed retainer lugs fitting within the dove-tailed sockets of the rotary head, the said arms being detachable from the head, substantially as described.

In testimony whereof I affix my signature in presence of two witnesses.

LEIGH HUNT.

Witnesses:
A. F. HALTER,
H. E. WERT.